No. 650,694. Patented May 29, 1900.
F. L. SHEPPARD.
COUPLING FOR BOILER SECTIONS.
(Application filed Dec. 14, 1898.)
(No Model.)
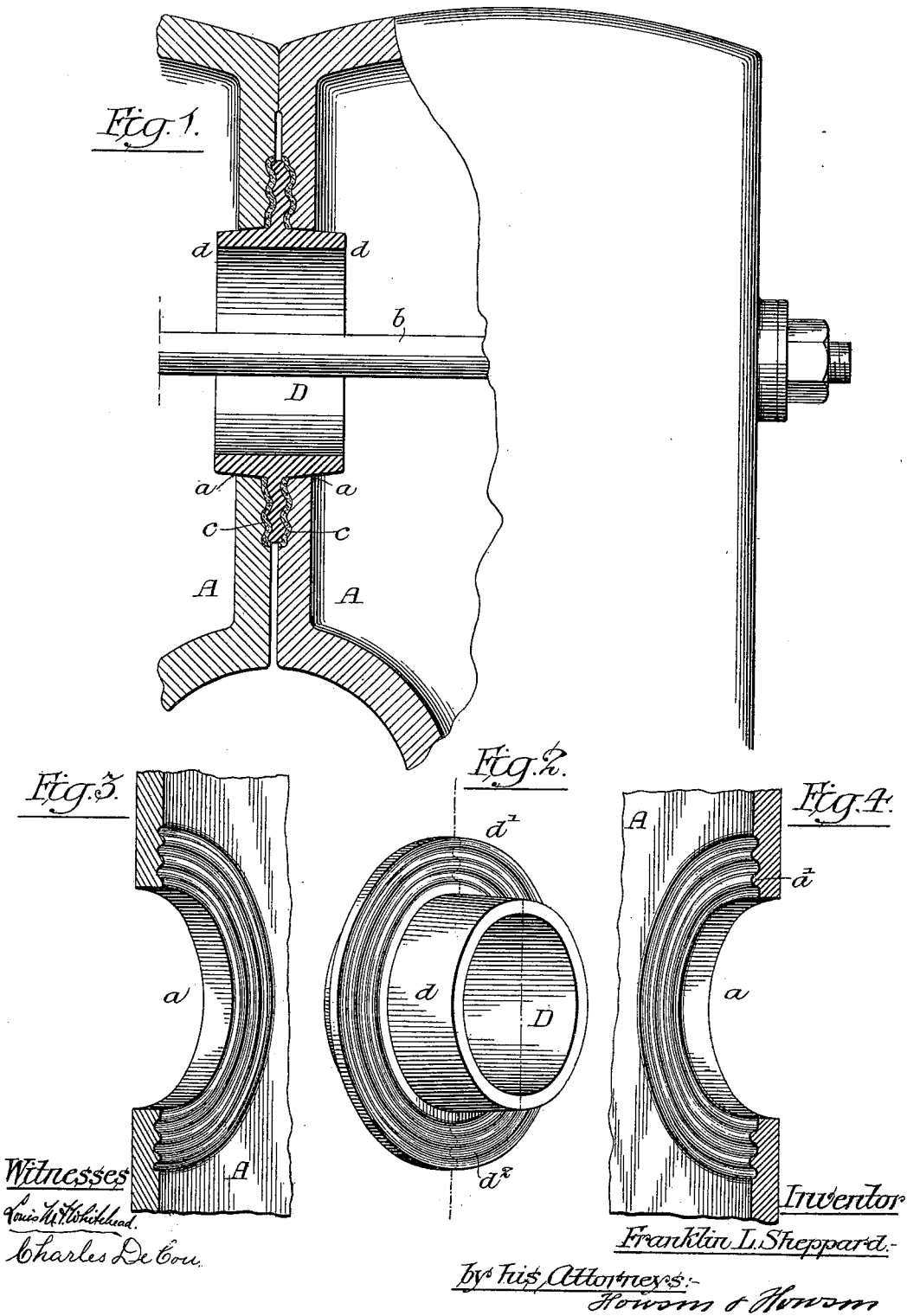
Witnesses
Inventor
Franklin L. Sheppard
by his Attorneys

UNITED STATES PATENT OFFICE.

FRANKLIN L. SHEPPARD, OF PHILADELPHIA, PENNSYLVANIA.

COUPLING FOR BOILER-SECTIONS.

SPECIFICATION forming part of Letters Patent No. 650,694, dated May 29, 1900.

Application filed December 14, 1898. Serial No. 699,259. (No model.)

*To all whom it may concern:*

Be it known that I, FRANKLIN L. SHEPPARD, a citizen of the United States, residing in Philadelphia, Pennsylvania, have invented certain Improvements in Couplings for Boiler-Sections, of which the following is a specification.

The object of my invention is to provide a steam and water tight coupling between the adjoining sections of a steam or hot-water boiler. In boilers for house-heating which are made up of series of coupled sections it is a difficult matter to make tight joints between the sections without accurate fitting and considerable machine-work; but by my invention I can couple the sections together so as to make a tight joint quickly and with little expense.

In the accompanying drawings, Figure 1 is a sectional view of sufficient of a boiler to illustrate my invention. Fig. 2 is a perspective view of the coupling-nipple, and Figs. 3 and 4 are sectional perspective views of portions of the adjoining boiler-sections.

A A are two boiler-sections having openings $a\ a'$, through which the water circulates from one section to the other. Through these openings pass the securing-bolts $b$, which tie the sections together. On the outer surface of each section around the opening $a$ are a series of annular ribs $a'$.

D is a nipple having two members $d\ d$, preferably tapered and separated by a central flange $d'$. On both faces of this flange are annular ribs $d^2$, arranged at such a distance apart that they will fit between the ribs $a'$ on the boiler-sections. The openings $a$ in the sections are preferably tapered and reamed so that the tapered members of the nipple will fit snugly in each opening, one member being adapted to an opening in one section and the other member to an opening in the adjoining section. I preferably mount between the flange and the boiler-sections washers $c$ of asbestos or other suitable material, and in some instances I coat the washers with asbestos paint.

In assembling the boiler-sections I place the washers $c\ c$ on each side of the flange of each nipple, place the nipple in position and pass the tie-rod $b$ through the nipples and sections, then tighten up the nut on the tie-rod $b$, drawing the sections and the nipples close together, the ribs on the sections and on the flange of the nipples corrugating the asbestos washers, forming, with the tapered members, an absolutely-tight fit.

While my coupling is especially adapted for use in connection with the sections of steam or hot-water boilers, it can be used at any point where a coupling of this type is desirable.

I claim as my invention—

1. The combination of two boiler-sections having tapered openings, and a nipple having tapered members adapted to said openings, said nipple having also a flange serving to fill a portion of the space between the boiler-sections, substantially as described.

2. The combination of two boiler-sections, having openings, annular ribs on the outer side of each section around the opening, a nipple having a central ribbed flange, the ribs of the flange alternating with the ribs of the boiler-sections, and having members extending into the openings in the sections, substantially as described.

3. The combination of two boiler members, each having an opening, annular ribs around each opening, a nipple having tapered sections adapted to the openings in the boiler-sections and a flange, said flange having ribs on each side alternating with the ribs on the boiler-sections, and packing material between the flange and the boiler-sections, substantially as described.

4. As a new article of manufacture, a coupling-nipple having a central ribbed flange, and a smooth tapered member on each side of said flange, substantially as described.

5. As a new article of manufacture, a coupling-nipple, having a flange with annular ribs on each side, and having a tapered member extending from each side of the flange, substantially as described.

In testimony whereof I have signed my name to this specification in the presence of two subscribing witnesses.

FRANKLIN L. SHEPPARD.

Witnesses:
WILL. A. BARR,
JOS. H. KLEIN.